United States Patent
Egan et al.

(10) Patent No.: US 7,627,774 B2
(45) Date of Patent: Dec. 1, 2009

(54) REDUNDANT MANAGER MODULES TO PERFORM MANAGEMENT TASKS WITH RESPECT TO AN INTERCONNECT STRUCTURE AND POWER SUPPLIES

(75) Inventors: Kevin A. Egan, Plano, TX (US); Brad O. Underwood, Plano, TX (US); Mark E. Shaw, Garland, TX (US); Mark A. Shaw, Sachse, TX (US); Brian M. Johnson, Dallas, TX (US); D. Glen Edwards, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 11/066,024

(22) Filed: Feb. 25, 2005

(65) Prior Publication Data
US 2006/0195558 A1 Aug. 31, 2006

(51) Int. Cl.
G06F 11/00 (2006.01)
G06F 11/16 (2006.01)

(52) U.S. Cl. .............................. 714/4; 714/14; 714/22; 713/340; 713/300

(58) Field of Classification Search .................... 714/4, 714/5, 14, 56, 22; 713/300, 340
See application file for complete search history.

(56) References Cited

U.S. PATENT DOCUMENTS

| | | | | |
|---|---|---|---|---|
| 4,495,568 A | * | 1/1985 | Gilbert et al. | 714/22 |
| 5,081,629 A | * | 1/1992 | Criswell et al. | 714/55 |
| 5,210,756 A | * | 5/1993 | Kummer et al. | 714/4 |
| 5,283,905 A | * | 2/1994 | Saadeh et al. | 713/324 |
| 5,455,940 A | * | 10/1995 | Daniel et al. | 714/4 |
| 5,485,576 A | | 1/1996 | Fee | |
| 5,652,893 A | | 7/1997 | Ben-Meir | |
| 5,747,889 A | | 5/1998 | Raynham et al. | |
| 6,008,971 A | | 12/1999 | Duba et al. | |
| 6,092,190 A | | 7/2000 | Lee | |
| 6,505,311 B1 | * | 1/2003 | Ichinohe et al. | 714/56 |
| 6,622,250 B1 | | 9/2003 | Castillo et al. | |
| 6,691,248 B1 | * | 2/2004 | Nishijima et al. | 714/14 |
| 6,735,704 B1 | | 5/2004 | Butka et al. | |
| 7,051,233 B2 | * | 5/2006 | Fukumori et al. | 714/14 |
| 7,058,703 B2 | | 6/2006 | Hawkins | |
| 7,178,052 B2 | * | 2/2007 | Hebbar et al. | 714/4 |
| 7,246,256 B2 | * | 7/2007 | De La Cruz et al. | 714/4 |
| 7,287,187 B2 | * | 10/2007 | Williams et al. | 714/14 |
| 7,478,251 B1 | * | 1/2009 | Diab et al. | 713/300 |
| 2002/0049923 A1 | * | 4/2002 | Kanazawa et al. | 714/5 |
| 2003/0126473 A1 | * | 7/2003 | Maciorowski et al. | 713/300 |
| 2004/0078663 A1 | * | 4/2004 | Inaba | 714/22 |
| 2004/0107383 A1 | | 6/2004 | Bouchier et al. | |
| 2006/0149873 A1 | | 7/2006 | Underwood | |

OTHER PUBLICATIONS

The Use of Triple-Modular Redundancy to Improve Computer Reliability by Lyons and Vanderkulk IBM Journal Apr. 1962 pp. 200-209 found at http://www.research.ibm.com/journal/rd/062/ibmrd0602F.pdf retrieved Mar. 16, 2008.*

(Continued)

Primary Examiner—Scott T Baderman
Assistant Examiner—Joseph Schell

(57) ABSTRACT

A system comprises plural electronic modules, at least one interconnect structure and plural power supplies. The electronic modules communicate over the interconnect structure. The system further comprises plural redundant manager modules to perform management tasks with respect to the at least one interconnect structure and the power supplies.

22 Claims, 4 Drawing Sheets

OTHER PUBLICATIONS

Brad O. Underwood et al., U.S. Appl. No. 11/028,926, entitled "Bus Isolation Apparatus and Method," filed Jan. 4, 2005, pp. 1-16; Figs. 1-3.

Philips Semiconductors, "The I²C-Bus Specification," Version 2.1, pp. 1-46 (Jan. 2000).

Phillips Semiconductors, "The 12C-Bus Specification, Version 2.1," Jan. 2000, pp. 1-46.

U.S. Appl. No. 11/028,926, Office Action dated Aug. 21, 2006, pp. 1-8 and attachments.

U.S. Appl. No. 11/028,926, Final Rejection dated Jun. 18, 2007, pp. 1-11.

* cited by examiner

REDUNDANT MANAGER MODULES TO PERFORM MANAGEMENT TASKS WITH RESPECT TO AN INTERCONNECT STRUCTURE AND POWER SUPPLIES

BACKGROUND

Modern high performance electronic systems, such as computer server systems, storage server systems, telecommunication switch systems, and so forth, can include multiple electronic modules (e.g., processing modules, storage modules, switch modules, etc.). Often, it is desired that redundant components be implemented in such electronic systems to increase the likelihood that the electronic systems remain operational in the event of failure of certain components. If one power supply were to fail, the remaining one or more power supplies can continue to provide power to the electronic system. The defective power supply can then be removed and replaced, while the electronic system continues to operate.

As another example, an electronic system having multiple electronic modules can include redundant interconnect structures. Interconnect structures include interconnect circuitry and devices that enable the electronic modules to communicate with each other, as well as with remote nodes or devices. For redundancy, multiple sets of interconnect structures can be provided such that failure of any one set does not cause the electronic system to crash.

Although redundancy has been provided for power supplies and interconnect structures, conventional electronic systems may still include other single points of failure that may cause the electronic system to crash. For example, in some conventional electronic systems, the redundant power supplies and interconnect structures may be controlled by a single management module. Example tasks performed by such a management module include managing power supplies and controlling resets of interconnect structure components. Failure of the single management module in the electronic system may cause the entire electronic system to stop functioning despite the presence of redundant power supplies and interconnect structures.

DETAILED DESCRIPTION

Figure 1:
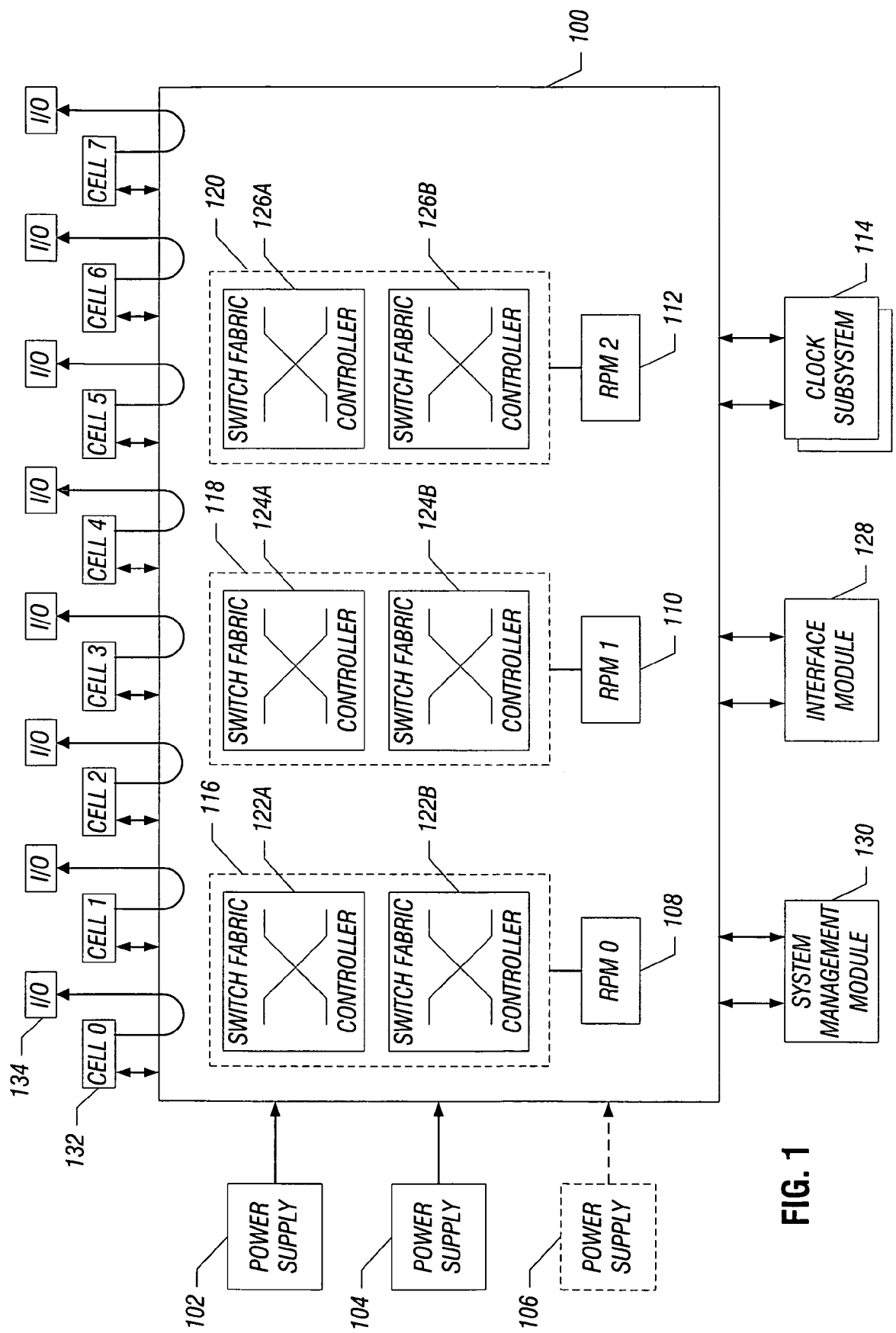
FIG. 1 is a block diagram of an electronic system that includes a redundancy mechanism according to an embodiment of the invention.

FIG. 1 illustrates an example electronic system that includes a backplane 100, which includes interconnect circuits and components (referred to collectively as "interconnect structures") for enabling devices of the electronic system to communicate with each other. The electronic system depicted in FIG. 1 is an example of a computer server system that has a plurality of processing cells 132 (eight processing cells illustrated in the example of FIG. 1). Each processing cell includes one or more central processing units (CPUs) and related devices, such as memory devices, input/output (I/O) control devices, and so forth. The processing cells 132 are connected to respective I/O blocks 134 for communicating with other systems. Although an exemplary computer server system is depicted in FIG. 1, other embodiments of the invention can be implemented in other types of electronic systems, such as storage server systems, telecommunication switch systems, and so forth.

The processing cells 132 are able to communicate with each other over the backplane 100. The interconnect structures of the backplane 100 include multiple switch fabrics 116, 118, and 120. Each switch fabric 116, 118, 120 includes a pair of switch fabric controllers (switch fabric controllers 122A, 122B in the switch fabric 116, switch fabric controllers 124A, 124B in the switch fabric 118, and switch fabric controllers 126A, 126B in the switch fabric 120). Each switch fabric 116, 118, 120 also includes interconnect circuits (communication lines or buses). Communication over the interconnect circuits are controlled by respective switch fabric controllers, which perform switching tasks to route messages among the processing cells. The presence of multiple switch fabric controllers within each switch fabric 116, 118, 120 provides redundancy, as well as enhanced communications bandwidth. Although a pair of switch fabric controllers are provided in each switch fabric 116, 118, 120, it is contemplated that in other embodiments, each switch fabric 116, 118, 120 can include a smaller or larger number of switch fabric controllers.

The electronic system of FIG. 1 also includes multiple power supplies 102, 104, and 106. The power supply 106 is depicted in dashed lines to indicate that it is optional. Thus, in some implementations, only two power supplies 102, 104 are provided. However, in other implementations, three or more power supplies can be provided in the electronic system. Each power supply 102, 104, 106 can be implemented as a power supply board that is removably mounted in the electronic system. For example, the backplane 100 can have connectors for receiving respective power supply boards 102, 104, 106. The power supply boards can be hot-swappable, which means that the power supply boards can be removed and re-mounted to the backplane 100 while the electronic system remains live and operational.

The switch fabric controllers of the backplane 100 are clocked by clock signals from one or more clock subsystems 114. Multiple clock subsystems 114 provide redundancy to ensure continued operation of the electronic system should any one of the clock subsystems fail. In some other embodiments, however, one clock subsystem 114 can be used.

Other components of the electronic system include an interface module 128, which enables communication between the electronic system depicted in FIG. 1 and other nodes or systems, such as user systems or other electronic systems. The interface module 128 is able to communicate with redundant reset and power management modules 108, 110, and 112.

Each of the reset and power management modules 108, 110, 112 can perform the following tasks: power supply management (power supply health monitor and enable/disable control); clock subsystem monitoring; and reset control and health monitoring of the switch fabric controllers. More generally, the tasks performed by the reset and power management modules are referred to as "management tasks." The three reset and power management modules 108, 110, and 112 are redundant modules. If any one or even two of the reset and power management modules should fail, the electronic system can nevertheless continue to operate due to the presence of the remaining functional one or more reset and power management modules. Although three redundant reset and power management modules are depicted in FIG. 1, it is contemplated that other embodiments can employ two reset and power management modules or more than three reset and power management modules.

In one example, if the reset and power management module 112 should fail, the remaining reset and power management modules 108, 110 can continue to perform management tasks with respect to the switch fabrics 116, 118, clock subsystems 114, and power supplies 102, 104, 106. This is contrasted to conventional systems where only a single reset and power management module is provided such that failure of such reset and power management module would cause the entire electronic system to fail. In contrast, according to the embodiment of FIG. 1, failure of the reset and power management module 112 would only cause the switch fabric 120 to become unavailable, and portions of the power supplies 102, 104, 106 to become disabled. However, system operation can continue with the remaining switch fabrics 116, 118, and remaining portions of the power supplies 102, 104, 106.

The reset and power management modules 108, 110, 112 can be implemented as field programmable gate arrays (FPGAs), application-specific integrated circuits (ASICs), microcontrollers, microprocessors, and so forth. Each reset and power management module 108, 110, 112 can be removably mounted to the backplane 100 such that a failed reset and power management module can be removed and replaced with a functional reset and power management module.

According to one embodiment, the reset and power management modules 108, 110, and 112 are independent of each other and do not rely upon each other for their tasks. No handshaking or other form of interaction is performed between the reset and power management modules 108, 110, 112. Consequently, in the event of a failure of any single reset and power management module, corruption of management and reporting tasks of the other reset and power management modules would not occur to enhance the likelihood of continued operation of the electronic system.

Figure 2:
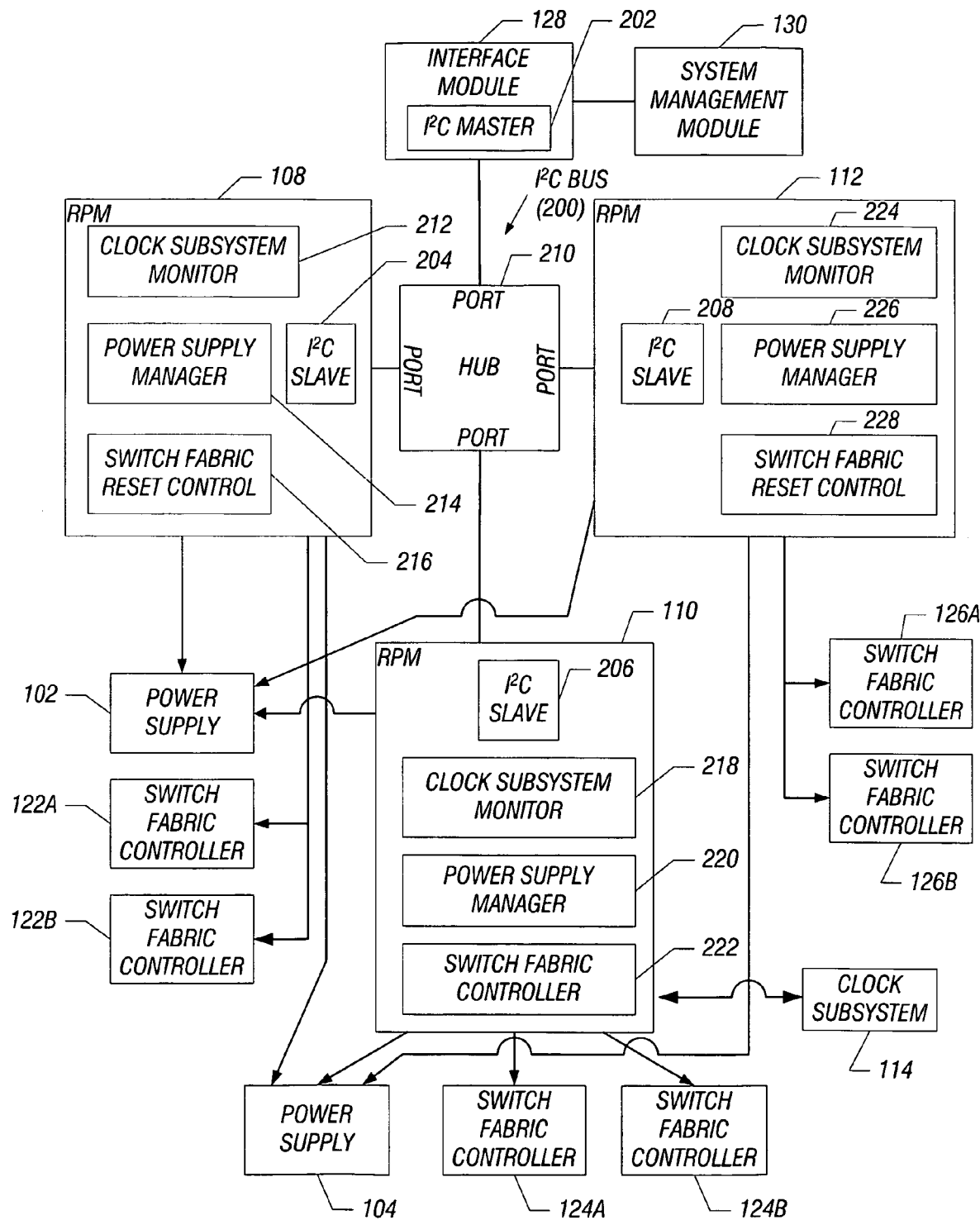
FIGS. 2 and 3 are block diagrams of the redundancy mechanism of FIG. 1, in accordance with an embodiment.
Figure 3:
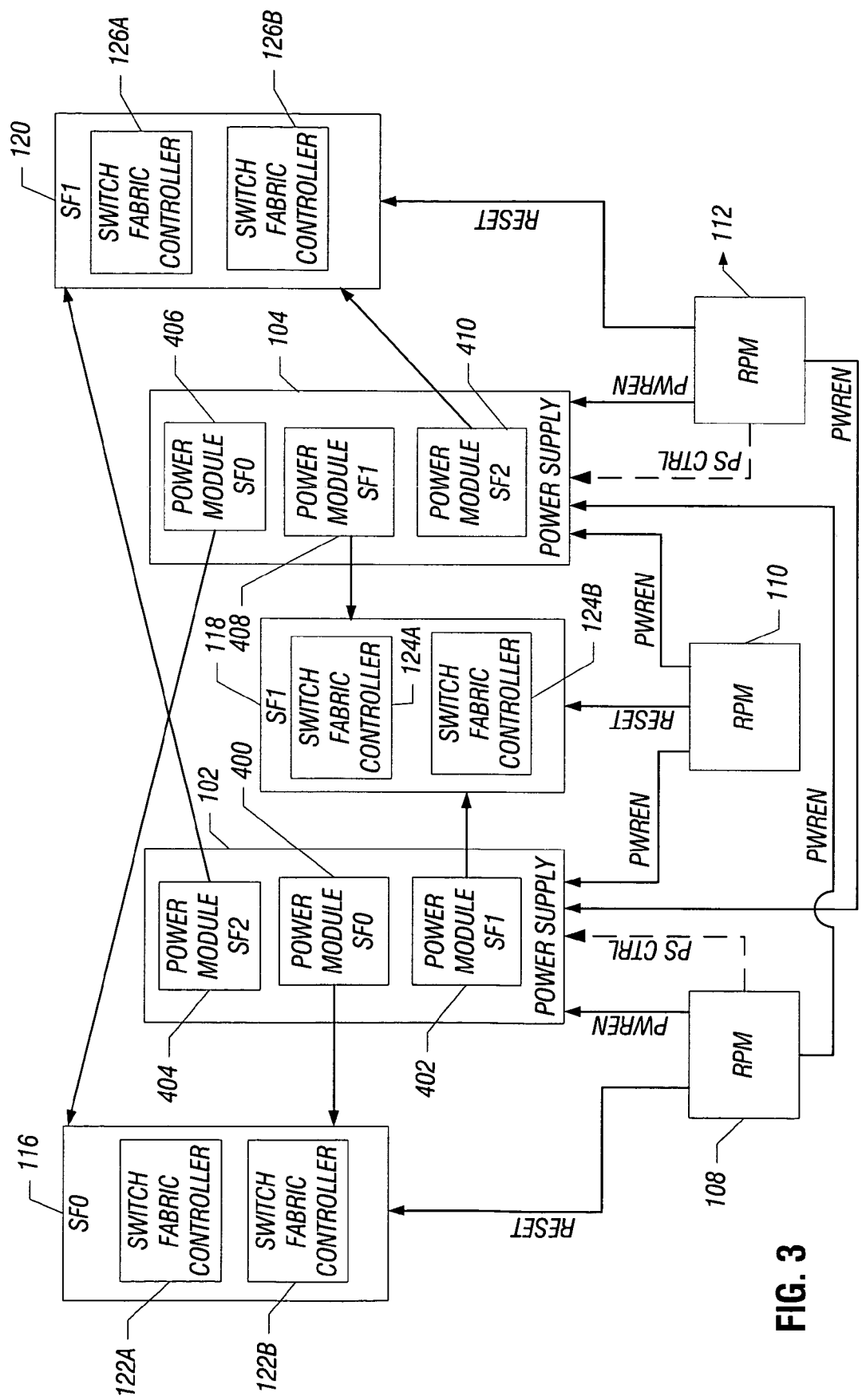

Referring to FIGS. 2 and 3, the interface module 128 and reset and power management modules 108, 110, and 112 are connected by an I$^2$C bus 200. The I$^2$C bus 200 is a type of serial bus to enable communication between bus devices. One version of the I$^2$C bus is described in the I$^2$C Bus Specification, Version 2.1, dated January 2000. In other implementations, other types of buses (serial bus or parallel bus) can be employed to interconnect the interface module 128 with the reset and power management modules 108, 110, 112. The reset and power management modules communicate health related information regarding the power supplies, clock subsystem, and/or switch fabrics to the interface module 128. In turn, the interface module 128 communicates the health-related information to a system management module 130 (FIG. 1).

The interface module 128 is also the device through which other systems can communicate with the system management module 130. For example, a system administrator or other user can remotely access information (e.g., health-related information pertaining to power supplies, clock subsystem, and switch fabrics) collected by the reset and power management modules through the interface module 128. The system administrator or other user can be located at a remote user system that is coupled to the electronic system over a network. Similarly, the remote client system can be used to control the reset and power management modules through the interface module 128. For example, the system administrator or other user can instruct a particular reset and power management module to disable a switch fabric or a power supply.

In the embodiment of FIG. 2, the I$^2$C bus 200 includes a hub 210 having multiple ports for connection to respective modules 128, 108, 110, 112. In a different embodiment, the hub 210 can be omitted, with the interface module 128 and reset and power management modules 108, 110, 112 connected to a set of lines defining the I$^2$C bus 200. The hub 210 provides the benefit of enabling isolation of a defective reset and power management module 108, 110 or 112 such that the defective reset and power management module does not cause failure or corruption of the remaining reset and power management modules.

According to one embodiment, the interface module 128 includes an I$^2$C bus master module 202, and each of the reset and power management modules 108, 110, 112 includes respective I$^2$C bus slave modules 204, 206, 208. I$^2$C cycles are initiated by the I$^2$C bus master module 202, with a bus slave module in one of the reset and power management modules 108, 110, 112 responding to the bus master-initiated I$^2$C cycles. Each reset and power management module includes a clock subsystem monitor, a power supply manager, and a switch fabric reset control logic (212, 214, 216, respectively, in the reset and power management module 108; 218, 220, 222, respectively, in the reset and power management module 110; and 224, 226, 228, respectively, in the reset and power management module 112). The power supply manager 214, 220, 226 controls and monitors a respective power supply 102, 104, 106. The power supply manager is able to monitor the health of the respective power supply. The status of the power supply is reported by the respective power supply manager to a system management module 130 through the interface module 128. If a power supply (or a component in the power supply) is defective, then the power supply manager is able to disable the power supply (or the component in the power supply) and to inform the system management module 130 of the failure and disabling of the power supply (or the component). This status is then reported by the system management module 132 to a user or system administrator such that the user or system administrator is able to replace the power supply.

A power supply can include several power modules, such as one power module per switch fabric. As depicted in FIG. 3, the power supply 102 has a power module 400 to provide power to the switch fabric 116; a power module 402 to provide power to the switch fabric 118; and a power module 404 to provide power to the switch fabric 120. Similarly, the power supply 104 has a power module 406 to power the switch fabric 116, a power module 408 to power the switch fabric 118, and a power module 410 to power the switch fabric 120. Each power module includes one or plural DC-DC converters.

The clock subsystem monitor 212, 218, 224 monitors the health of a respective clock subsystem 114 and reports the status and health information to the system management module 130 over the I$^2$C bus 200. If only one clock subsystem 114 is present in the system, then one of the reset and power management modules (e.g., module 110) is used to monitor the health of the clock subsystem, while the clock subsystem monitor in the remaining two reset and power management modules are left un-connected.

The switch fabric reset control logic 216 sends configuration information to the set of switch fabric controllers 122A-B in the switch fabric 116 (FIG. 1) to enable performance of programmed tasks by the switch fabric controllers. Similarly, switch fabric reset control logic 222 or 228 sends configuration information to a respective set of switch fabric controllers 124A-B or 126A-B. Switch fabric reset control logic 216, 222, 228 also control the reset of respective sets of switch fabric controllers 122A-B, 124A-B, 126A-B. To disable a set of switch fabric controllers, the switch fabric reset control logic maintains activated a Reset signal (FIG. 3) to the respective switch fabric controllers. The switch fabric reset control logic is able to detect the health of a respective set of switch fabric controllers to determine whether or not the switch fabric controllers are to be maintained in a reset state.

As further depicted in FIG. 3, each reset and power management module 108, 110, 112 provides a separate PWREN signal to a respective power module in each power supply 102, 104. Thus, for example, the reset and power management module 108 provides a PWREN signal to the power module 400 in the power supply 102, and provides another PWREN signal to the power module 406 in the power supply 104. In this manner, the reset and power management module 108 can individually enable the respective power module 400 or 406 by activating the respective PWREN signal. In other words, if the PWREN signal to the power module 400 is inactivated, then the power module 400 is disabled from providing power to the switch fabric controllers 122A-B in the switch fabric 116.

Similarly, the reset and power management module 110 provides separate PWREN signals to the power module 402 and power module 408, respectively, in respective power supplies 102 and 104. The reset and power management module 112 provides separate PWREN signals to the power module 404 and power module 410 in the respective power supplies 102 and 104. Thus, in the arrangement of FIG. 3, failure of the reset and power management module 110 would cause the power module 402 and power module 408 to be disabled (since the PWREN signals remain disabled), and to cause the switch fabric 118 to be disabled (since the Reset signal is maintained activated). Failure of the reset and power management module 110, according to one embodiment, causes the reset and power management module 110 to tristate all its outputs. In one implementation, the PWREN signals are pulled to an inactive state by pull-down resistors or pull-up resistors (as appropriate), and the Reset signals are maintained at an active state by a pull-up or pull-down resistor. Note, that failure of the reset and power management module 110 allows the remaining power modules of power supplies 102 and 104 to continue to provide power to respective switch fabrics 116 and 120.

According to the implementation of FIG. 2, the reset and power management module 110 also monitors the health of the clock subsystem 114. As a result, if the reset and power management module 110 fails, then the health monitoring task of the clock subsystem 114 is not performed. However, not monitoring the health of the clock subsystem 114 does not cause failure of the system, as the clock subsystem 114 can continue to operate.

The reset and power management modules 108 and 112 differ from the reset and power management module 110 in that the reset and power management modules 108 and 112 are "controlling" management modules for the respective power supplies 102 and 104. The reset and power management module 108 provides power supply control signals (indicated by a dashed line) to the power supply 102, and the reset and power management module 112 provides power supply control signals (indicated by a dashed line) to the power supply 104. Each reset and power management module 108, 112 is "controlling" in the sense that they control the entire respective power supply 102, 104, not just the power modules that provide power to switch fabrics. If either the reset and power management module 108 or 112 fails, then a respective entire power supply 102 or 104 will also be disabled.

Thus, failure of the reset and power management module 108 causes the entire power supply 102 to be disabled, and causes the power module 406 in the power supply 104 to be disabled. Failure of the reset and power management module 108 also disables the switch fabric 116.

Similarly, failure of the reset and power management module 112 causes the entire power supply 104 to be disabled, and causes the power module 404 in the power supply 102 to be disabled. Failure of the reset and power management module 112 also disables the switch fabric 120.

Figure 4:
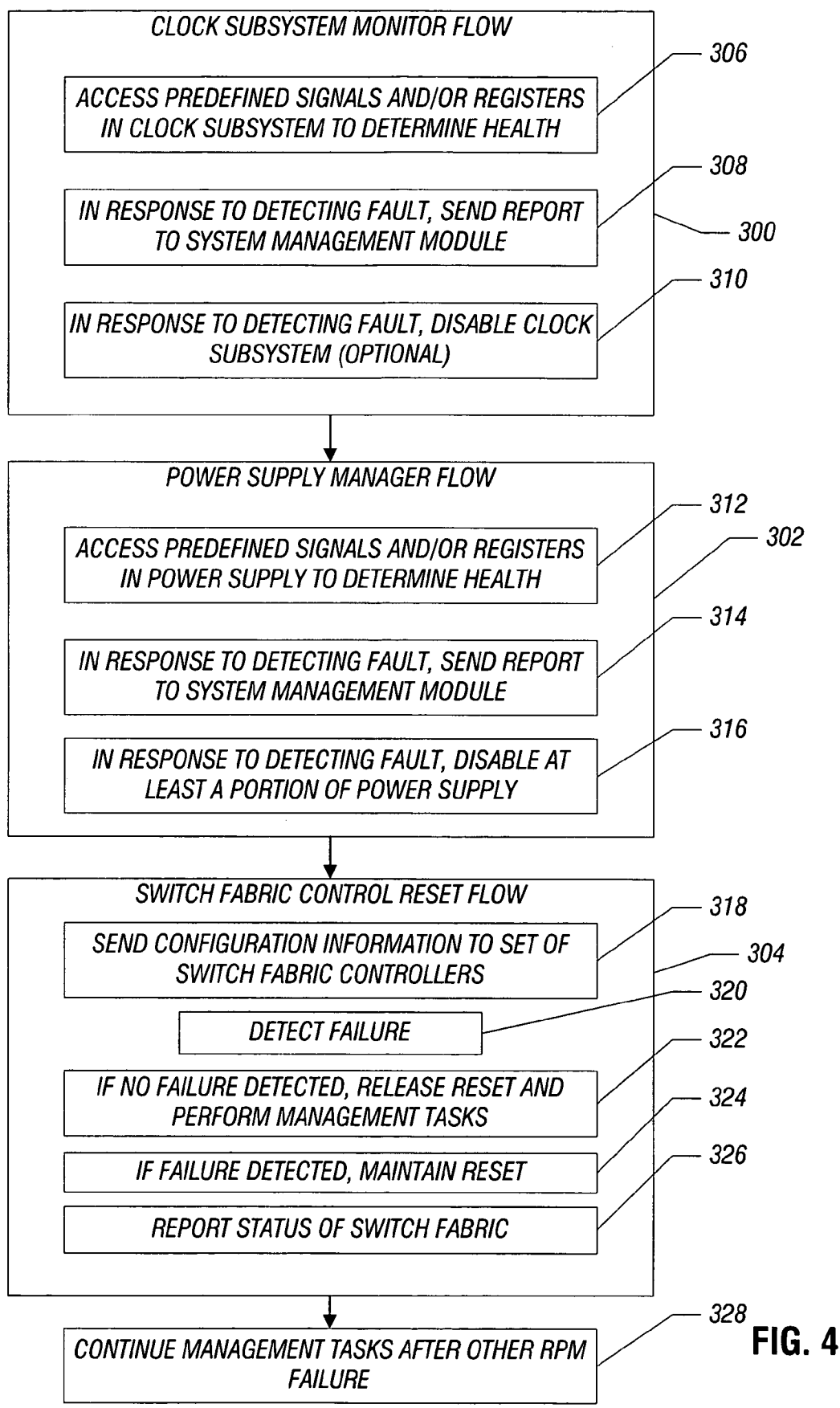
FIG. 4 is a flow diagram of a process of managing components using manager modules in the redundancy mechanism, according to an embodiment.

FIG. 4 illustrates a flow diagram of flows performed by the clock subsystem monitor (300), power supply manager (302), and switch fabric control reset logic (304) of each reset and power management module. In the clock subsystem monitor flow (300), the clock subsystem monitor accesses (at 306) predefined signals and/or registers in the clock subsystem 114 (FIG. 1) to determine the health of the clock subsystem 114. The predefined signals and/or registers in the clock subsystem may indicate that certain components of the clock subsystem have failed.

In response to detecting a fault, the clock subsystem monitor sends (at 308) a report to the system management module 130 (FIG. 1). Also, optionally, in response to detecting a fault, the clock subsystem monitor can disable (at 310) the clock subsystem. This last act performed by the clock subsystem monitor assumes that there are redundant clock subsystems in the electronic system.

In the power supply manager flow (302), the power supply manager accesses (at 312) predefined signals and/or registers in the power supply to determine the health of the power supply. In response to detecting a fault, the power supply manager sends (at 314) a report to the system management module 130 (FIG. 1). Also, in response to detecting fault, the power supply manager disables (at 316) the respective power supply (or a component in the power supply). For example, the power supply manager can disable a power module for a particular switch fabric in the power supply. Alternatively, the power supply manager may even be able to selectively disable a particular DC-DC converter within the power module.

In the switch fabric control reset flow (304), the switch fabric control reset logic sends (at 318) configuration information to a set of switch fabric controllers. Next, the switch fabric control reset logic detects (at 320) failure of the switch fabric controllers. If no failure occurs, then the Reset signal (FIG. 3) to the switch fabric can be released to enable the switch fabric controllers to initiate. However, if failure of the switch fabric is detected, then the Reset signal is maintained active (at 324) to disable the switch fabric controllers. The status of the switch fabric is reported (at 326) to the system management module 130 (FIG. 1).

One reset and power management module can continue (at 328) to perform management tasks with respect to respective power modules and switch fabric controllers even though another reset and power management module has failed.

The flow of FIG. 4 can be controlled by hardware, firmware, or software executable by each reset and power management module. Instructions of the software can be loaded into each reset and power management module for execution.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   plural electronic modules;
   interconnect structures, the electronic modules to communicate over the interconnect structures;
   plural power supplies;
   plural redundant manager modules to perform management tasks with respect to the interconnect structures and the power supplies, wherein the management tasks performed with respect to the power supplies include monitoring health of the power supplies by the manager modules; and
   each of the manager modules to control reset of a respective one of the interconnect structures.

2. The system of claim 1, wherein each interconnect structure includes a respective controller to perform switching tasks.

3. The system of claim 1, wherein each manager module is to provide an enable signal to at least one of the power supplies for enabling the at least one power supply.

4. The system of claim 1, further comprising a clock subsystem,
   wherein at least one of the plural manager modules is adapted to monitor a health of the clock subsystem.

5. A system comprising:
   plural electronic modules;
   interconnect structures, the electronic modules to communicate over the interconnect structures;
   plural power supplies;
   plural redundant manager modules to perform management tasks with respect to the interconnect structures and the power supplies, wherein the management tasks performed with respect to the power supplies include monitoring health of the power supplies; and
   each of the manager modules to control reset of a respective one of the interconnect structures,
   wherein each power supply has plural power modules to provide power to respective interconnect structures, wherein the plural manager modules comprise first and second manager modules, and wherein the plural power supplies comprise first and second power supplies;
   wherein the first manager module is to provide a first enable signal to a first power module in the first power supply, and the first manager module is to provide a second enable signal to a first power module in the second power supply.

6. A system comprising:
   plural electronic modules;
   at least one interconnect structure, the electronic modules to communicate over the interconnect structure;
   plural power supplies; and
   plural redundant manager modules to perform management tasks with respect to the at least one interconnect structure and the power supplies,
   wherein each manager module is to provide an enable signal to at least one of the power supplies for enabling the at least one power supply,
   wherein each power supply has plural power modules to provide power to respective interconnect structures, wherein the plural manager modules comprise first and second manager modules, and wherein the plural power supplies comprise first and second power supplies;
   wherein the first manager module is to provide a first enable signal to a first power module in the first power supply, and the first manager module is to provide a second enable signal to a first power module in the second power supply,
   wherein the second manager module is to provide a third enable signal to a second power module in the first power supply, and the second manager module is to provide a fourth enable signal to a second power module in the second power supply.

7. The system of claim 6, wherein failure of the first manager module causes disabling of a first interconnect structure and disabling of the first power modules.

8. The system of claim 7, wherein failure of the second manager module causes disabling of a second interconnect structure and disabling of the second power modules.

9. The system of claim 8, further comprising a third interconnect structure and a third manager module, the first power supply further having a third power module to provide power to the third interconnect structure, and the second power supply further having a third power module to provide power to the third interconnect structure.

10. The system of claim 9, wherein failure of the first manager module further causes disabling of the first power supply, wherein failure of the second manager module further causes disabling of the second power supply.

11. The system of claim 10, wherein failure of the third manager module causes disabling of the third power modules without disabling other power modules of the first and second power supplies.

12. A method for use in a system having plural electronic modules interconnected by at least one interconnect structure, wherein the system has plural power supplies, the method comprising:
    performing management tasks with respect to the at least one interconnect structure and the power supplies using plural redundant manager modules, wherein a first of the manager modules is to provide enable signals to respective first power modules in the power supplies, and wherein a second of the manager modules is to provide enable signals to respective second power modules in the power supplies;
    operating the plural manager modules independently of each other such that handshaking among the plural manager modules is not performed; and
    after failure of one of the plural manager modules, at least another one of the plural manager modules continuing to perform management tasks with respect to the at least one interconnect structure and at least one of the power supplies to enable continued operation of the system,
    wherein the at least one interconnect structure comprises controllers to perform switching tasks over an interconnect circuit to enable communication between the electronic modules, wherein performing management tasks with respect to the controllers comprises each manager module controlling reset of a respective controller.

13. The method of claim 12, wherein at least one of the manager modules is adapted to monitor a health of a clock subsystem.

14. A method for use in a system having plural electronic modules interconnected by at least one interconnect structure, wherein the system has plural power supplies, the method comprising:
    performing management tasks with respect to the at least one interconnect structure and the power supplies using plural redundant manager modules;
    operating the plural manager modules independently of each other such that handshaking among the plural manager modules is not performed; and
    after failure of one of the plural manager modules, at least another one of the plural manager modules continuing to perform management tasks with respect to the at least one interconnect structure and at least one of the power supplies to enable continued operation of the system, wherein the system further comprising another interconnect structure, the manager modules to perform management tasks with respect to respective interconnect structures, and wherein failure of a first manager module causes disabling of one of the interconnect structures and at least a portion of one of the power supplies.

15. A system comprising:

plural electronic modules;

interconnect structures, the electronic modules to communicate over the interconnect structures;

plural power supplies;

plural redundant manager modules to perform management tasks with respect to the interconnect structures and the power supplies, wherein the management tasks performed with respect to the power supplies include monitoring health of the power supplies; and each of the manager modules to control reset of a respective one of the interconnect structures;

wherein the plural electronic modules comprise plural processing cells each including one or more central processing units, and wherein the power supplies are to provide power to the plural processing cells.

16. An apparatus for use in a system having plural electronic modules that are interconnected by plural redundant interconnect structures, the system further having plural redundant power supplies, the apparatus comprising:

plural redundant manager modules, wherein a first manager module is to perform management tasks with respect to a first interconnect structure and a first power supply, wherein a second manager module is to perform management tasks with respect to a second interconnect structure and a second power supply;

wherein the first manager module is to monitor a health of the first power supply, and wherein the second manager module is to monitor a health of the second power supply, wherein each of the first and second power supplies includes plural power modules to provide power to respective interconnect structures, wherein the first manager module is to provide a first enable signal to a first power module in the first power supply, and a second enable signal to a first power module in the second power supply, wherein the second manager module is to provide a third enable signal to a second power module in the first power supply, and a fourth enable signal to a second power module in the second power supply.

17. The apparatus of claim 16, wherein the second manager module is allowed to continue operation if the first manager module fails.

18. The apparatus of claim 17, wherein failure of the first manager module causes disabling of the first interconnect structure and at least a portion of the first power supply.

19. The apparatus of claim 18, wherein failure of the first manager module also causes disabling of at least a portion of the second power supply.

20. The apparatus of claim 19, wherein the portions of the first and second power supplies disabled by the failure of the first manager module comprise power modules in the first and second power supplies that provide power to the first interconnect structure.

21. The apparatus of claim 20, wherein the second manager module, in the event of failure of the first manager module, continues to perform management tasks with respect to the second interconnect structure and at least power modules of the power supplies that provide power to the second interconnect structure.

22. The apparatus of claim 16, wherein the system further comprises a clock subsystem, at least one of the plural manager modules to monitor a health of the at least one clock subsystem.

* * * * *

UNITED STATES PATENT AND TRADEMARK OFFICE
CERTIFICATE OF CORRECTION

| | | |
|---|---|---|
| PATENT NO. | : 7,627,774 B2 | Page 1 of 1 |
| APPLICATION NO. | : 11/066024 | |
| DATED | : December 1, 2009 | |
| INVENTOR(S) | : Kevin A. Egan et al. | |

It is certified that error appears in the above-identified patent and that said Letters Patent is hereby corrected as shown below:

In column 7, line 26, in Claim 5, delete "modules:" and insert -- modules; --, therefor.

In column 9, line 21, in Claim 15, delete "structures;" and insert -- structures, --, therefor.

Signed and Sealed this
Fifth Day of April, 2011

David J. Kappos
*Director of the United States Patent and Trademark Office*